United States Patent
Aoki et al.

(10) Patent No.: US 10,121,164 B2
(45) Date of Patent: Nov. 6, 2018

(54) METHOD FOR PROVIDING INFORMATION AND INFORMATION PROVIDING SYSTEM

(71) Applicant: Panasonic Corporation, Osaka (JP)

(72) Inventors: Hideshi Aoki, Osaka (JP); Yoshito Nakanishi, Osaka (JP); Yuichi Aoki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 846 days.

(21) Appl. No.: 14/487,099

(22) Filed: Sep. 16, 2014

(65) Prior Publication Data

US 2015/0088641 A1 Mar. 26, 2015

(30) Foreign Application Priority Data

Sep. 26, 2013 (JP) .................. 2013-199960
May 26, 2014 (JP) .................. 2014-107790

(51) Int. Cl.
*G06Q 30/02* (2012.01)

(52) U.S. Cl.
CPC .................. *G06Q 30/0251* (2013.01)

(58) Field of Classification Search
CPC .... G06Q 30/00; G06Q 30/02; G06Q 30/0251; G06F 3/147
USPC ....... 705/7.32; 340/568.1; 235/385; 709/223
See application file for complete search history.

(56) References Cited

U.S. PATENT DOCUMENTS

| | | | |
|---|---|---|---|
| 7,240,834 B2 * | 7/2007 | Kato ................... | G06Q 20/203 235/385 |
| 7,930,204 B1 * | 4/2011 | Sharma ................ | G06Q 30/02 705/7.32 |
| 8,102,262 B2 * | 1/2012 | Irmscher ............... | A47F 3/002 340/568.1 |
| 2009/0313365 A1 * | 12/2009 | Whitehead ........... | G06Q 20/20 709/223 |

FOREIGN PATENT DOCUMENTS

| | | |
|---|---|---|
| JP | 6-274764 | 9/1994 |
| JP | 2000-123086 | 4/2000 |
| JP | 2005-010608 | 1/2005 |
| JP | 2006-184387 | 7/2006 |
| JP | 2007-114957 | 5/2007 |
| JP | 2008-287570 | 11/2008 |
| JP | 2010-027043 | 2/2010 |
| JP | 2012-113661 | 6/2012 |

* cited by examiner

*Primary Examiner* — Marilyn G Macasiano
(74) *Attorney, Agent, or Firm* — Wenderoth, Lind & Ponack, L.L.P.

(57) ABSTRACT

If a customer has picked up a product from a display shelf, a display device displays first sales promotion information. In an information providing system, if the customer has not been attracted to the product and has returned the product to the display shelf, the display device displays second sales promotion information, which is different from the first sales promotion information. By displaying the different pieces of sales promotion information using the display device provided near the product, it is possible to promote the product to the customer in two different ways, thereby stimulating the customer's desire to buy the product and reducing loss in opportunities to sell the product.

13 Claims, 15 Drawing Sheets

FIG. 6

| PRODUCT CODE (601) | TARGET (602) | FIRST SALES PROMOTION INFORMATION (603) | SECOND SALES PROMOTION INFORMATION (604) | ... |
|---|---|---|---|---|
| ... | ... | ... | ... | ... |
| 06C01225Q | MEN | 01225m01.jpg | 01225m02.jpg | ... |
| | WOMEN | 01225f01.jpg | 01225f02.jpg | ... |
| 06C01226Q | WOMEN IN THEIR 10S OR 20S | 0122610f01.jpg | 0122610f02.jpg | ... |
| | WOMEN IN THEIR 30S OR 40S | 0122630f01.jpg | 0122630f02.jpg | ... |
| | WOMEN IN THEIR 50S OR OLDER | 0122650f01.jpg | 0122650f02.jpg | ... |
| 06C01227Q | NOT SPECIFIED | 01227a01.jpg | 01227a02.jpg | ... |
| ... | | | | ... |

421

METHOD FOR PROVIDING INFORMATION AND INFORMATION PROVIDING SYSTEM

BACKGROUND

1. Technical Field

The present disclosure relates to a method for providing sales promotion information.

2. Description of the Related Art

In order to improve the sales of products, it is necessary to stimulate customers' desire to buy the products. As a method for stimulating customers' desire to buy the products, a method for showing sales promotion information to the customers is used.

In general, the sales promotion information refers to advertisements for stimulating customers' desire to buy products. Therefore, the sales promotion information needs to be shown to customers effectively and certainly.

In Japanese Unexamined Patent Application Publication No. 2007-114957, a technique is disclosed in which the preference of each customer who reaches for products is analyzed in advance and sales promotion information according to each customer is displayed on a display device provided for each product.

SUMMARY

When sales promotion information is provided for customers, it is desired to stimulate a desire of many customers who have various preferences to buy products by providing different types of sales promotion information.

A method for providing information according to an aspect of the present disclosure is a method for providing information used by an information providing system that provides sales promotion information. A signal from a detector connected to the information providing system is used for determining whether a product has been picked from a display shelf for the product. If it has been determined that the product has been picked up from the display shelf, a display device connected to the information providing system displays first sales promotion information. If it has been determined on the basis of a signal from the detector that the product has been returned to the display shelf or if a certain period of time has elapsed since the product was picked up and if it has been determined on the basis of a signal from a first motion sensor connected to the information providing system that any person is present around the display shelf, the display device displays second sales promotion information, which is different from the first sales promotion information.

According to the method for providing information according to the aspect of the present disclosure, a desire of many customers who have various preferences to buy products can be stimulated.

Thus, a non-limiting exemplary embodiment of the present disclosure provides a method for providing information capable of stimulating a desire of many customers who have various preferences to buy products.

BRIEF DESCRIPTION OF THE DRAWINGS

FIG. 6 is a conceptual diagram illustrating the data configuration of a sales promotion information database.

DETAILED DESCRIPTION

UNDERLYING KNOWLEDGE FORMING BASIS OF THE PRESENT DISCLOSURE

First, problems examined by the present inventors in order to establish aspects of the invention disclosed in the present disclosure will be described.

In Japanese Unexamined Patent Application Publication No. 2007-114957, customers wear dedicated bracelets at an entrance of a store. When a customer wearing the bracelet has reached for a product, sales promotion information relating to the customer is displayed on a display device of the bracelet.

If the customer has returned the product to a display shelf, however, no additional information is displayed on the display device of the bracelet.

Therefore, if the customer has returned the product to the display shelf, it is difficult to stimulate the customer's desire to buy the product.

In addition, in Japanese Unexamined Patent Application Publication No. 2007-114957, the store selling products needs to prepare the bracelets for customers, which is troublesome. Similarly, a customer needs to wear the bracelet each time he/she enters the store, which is troublesome.

As a result of the above examination, the present inventors have conceived the aspects of the invention disclosed in the present disclosure, which will be described hereinafter.

Embodiment 1

An information providing system according to an embodiment of the present disclosure will be described with reference to the drawings.

Outline

Figure 1:
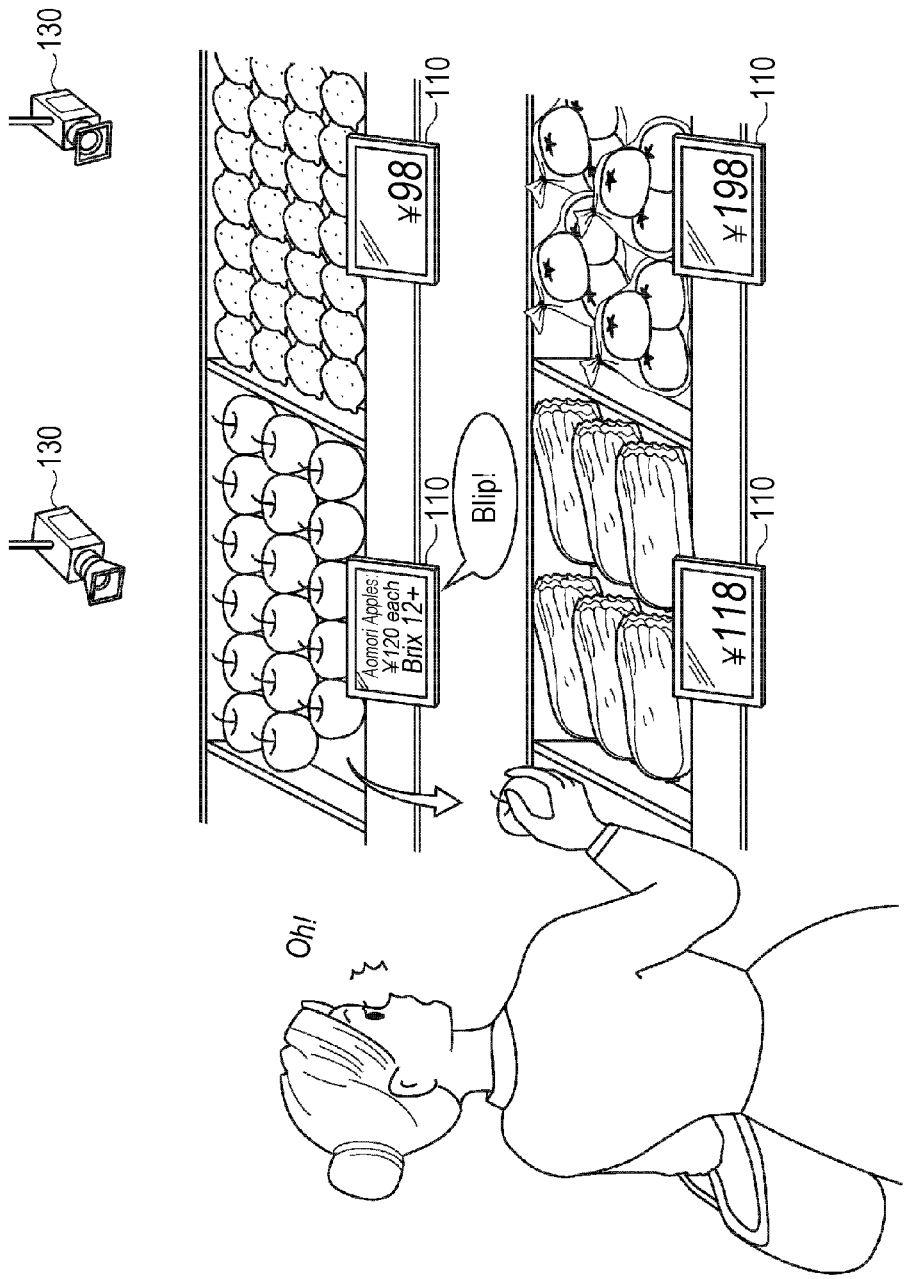
FIG. 1 is a diagram illustrating a mode in which an information providing system is used.

In the information providing system, as illustrated in FIG. 1, when a buyer has picked up a product from a display shelf, a display device displays first sales promotion information.

Figure 2:
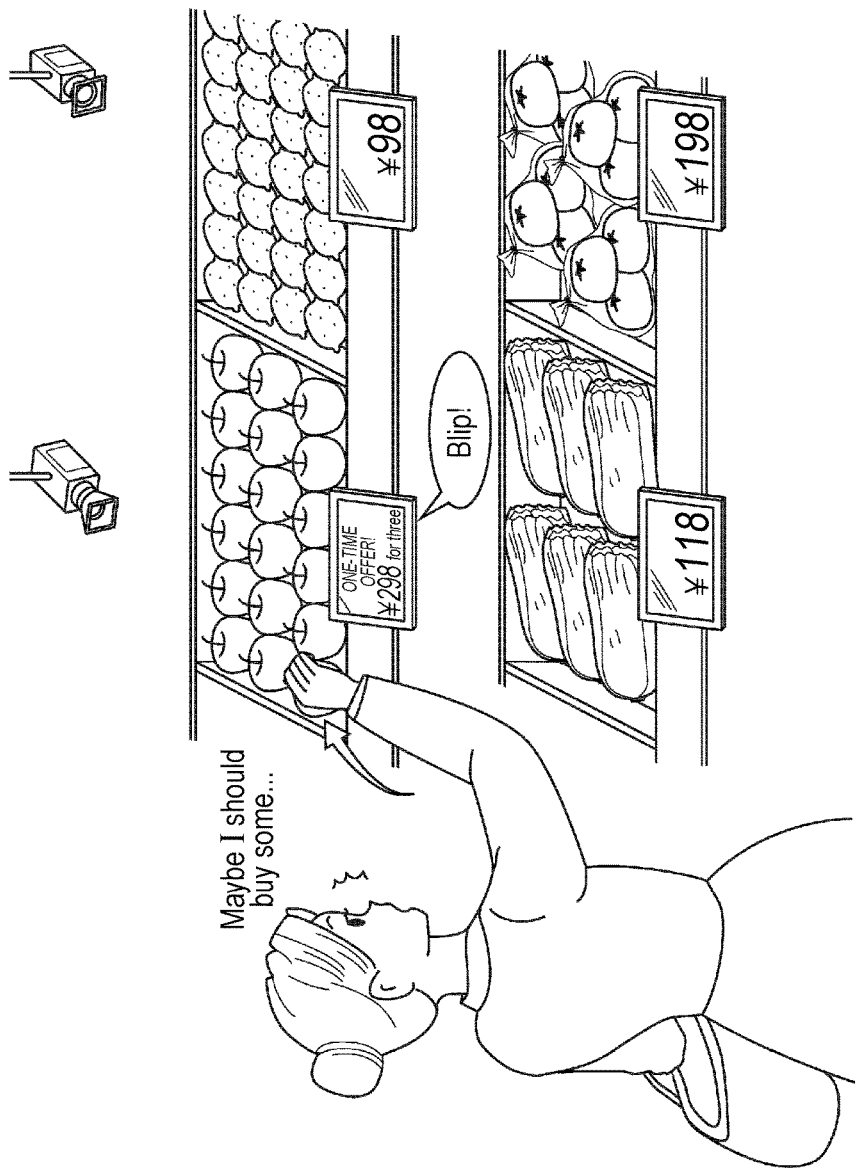
FIG. 2 is a diagram illustrating the mode in which the information providing system is used.

In the information providing system, as illustrated in FIG. 2, if the buyer has not been attracted to the product and has returned the product to the display shelf, the display device displays second sales promotion information.

Thus, in the information providing system, sales promotion information is displayed twice, namely when a product has been picked up and when the product has been returned.

Since a buyer can probably recognize the sales promotion information at these timings, it is possible to provide a plurality of opportunities to stimulate the buyer's desire to buy the product.

Any type of sales promotion information may be used insofar as the sales promotion information can stimulate customers' desire to buy products. It is only required that different pieces of sales promotion information be used when a product has been picked up and when the product has been returned.

Configuration

Figure 3:
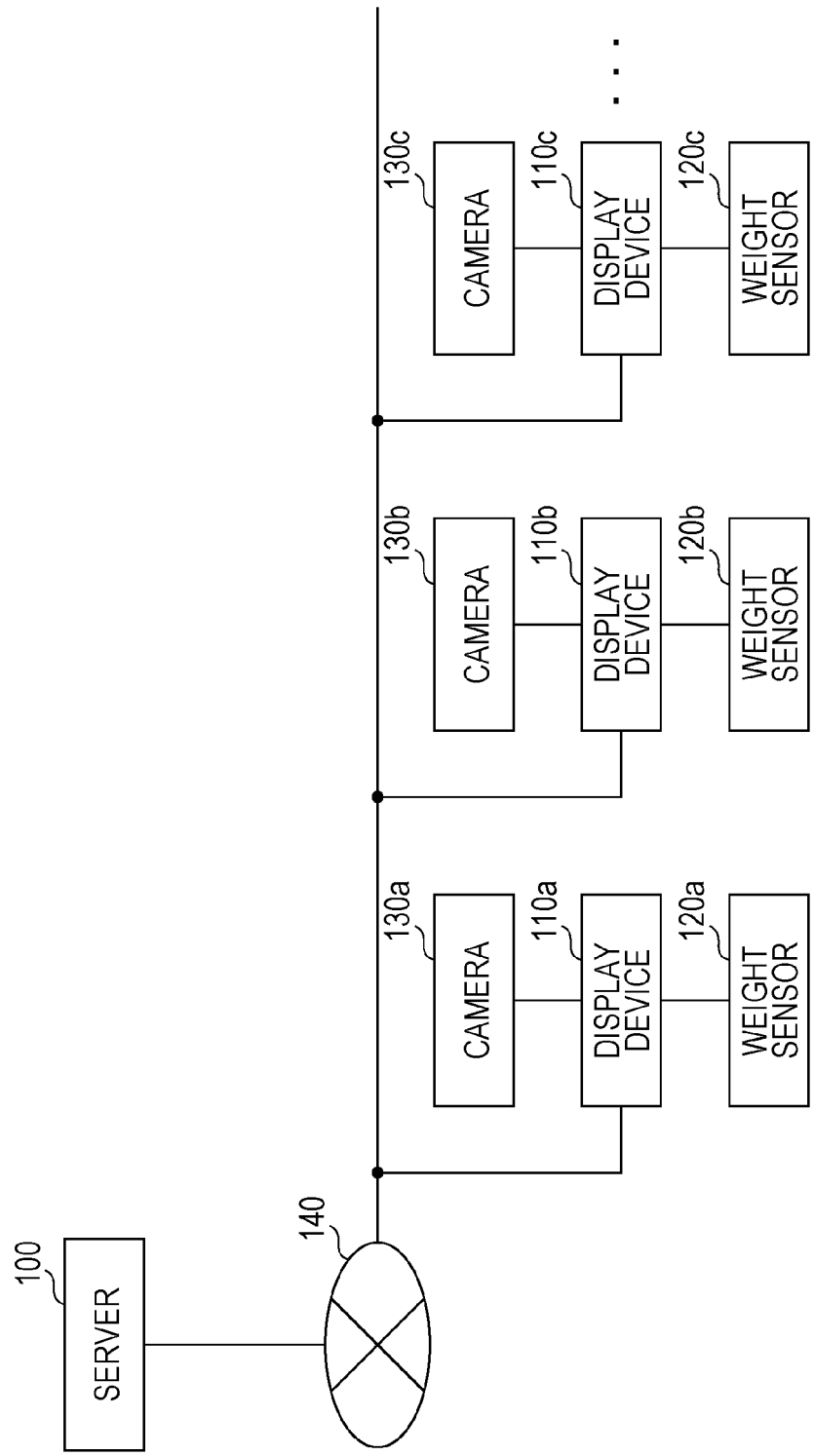
FIG. 3 is a diagram illustrating a system configuration.

FIG. 3 is a conceptual diagram illustrating the system configuration of the information providing system.

As illustrated in FIG. 3, the information providing system includes a server 100, display devices 110a, 110b, and 110c, weight sensors 120a, 120b, and 120c, and cameras 130a, 130b, and 130c. The server 100 and the display devices 110a to 110c are connected to each other through a wired or wireless network 140. In addition, the display devices 110a to 110c are connected to the weight sensors 120a to 120c and the cameras 130a to 130c, respectively. Although the number of display devices, weight sensors, and cameras is three each, the number of these devices obviously varies depending on the number of products dealt with and the magnitude of the store. Because the display devices 110a to 110c, the weight sensors 120a to 120c, and the cameras 130a to 130c have the same respective configurations and operations, these devices will be simply described as display devices 110, weight sensors 120, and cameras 130 hereinafter.

Figure 4:
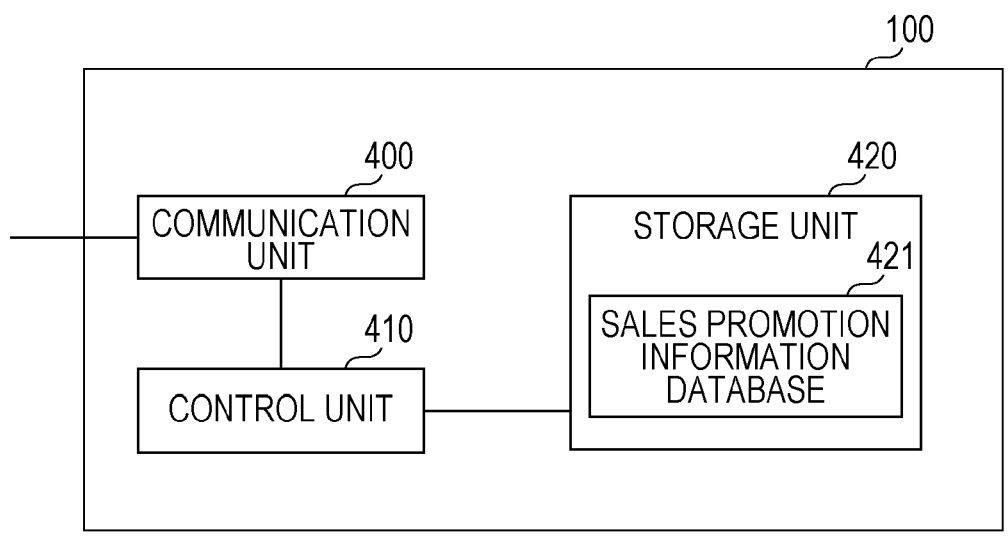
FIG. 4 is a diagram illustrating function blocks of a server.

FIG. 4 is a functional block diagram illustrating the functional configuration of the server 100.

As illustrated in FIG. 4, the server 100 includes a communication unit 400, a control unit 410, and a storage unit 420.

The communication unit 400 has a function of communicating with the display devices 110 through the network 140. More specifically, the communication unit 400 modulates data specified by the control unit 410 in accordance with a certain communication scheme and transmitting modulated signals to a display device 110 specified by the control unit 410. The communication unit 400 also has a function of receiving signals transmitted from the display devices 110 through the network 140, demodulating received data in accordance with the certain communication scheme, and transmitting the demodulated data to the control unit 410.

The control unit 410 is a processor and has a function of controlling the components of the server 100 by executing programs stored in the storage unit 420. The control unit 410 has a function of, upon receiving, from one of the display devices 110, a sales promotion information request to request sales promotion information, extracting sales promotion information corresponding to a product indicated by the sales promotion information request from a sales promotion information database 421 stored in the storage unit 420 and instructing the communication unit 400 to transmit the extracted display device sales promotion information to the display device 110 that has transmitted the sales promotion information request. Here, the display device sales promotion information transmitted to the display device 110 includes the first sales promotion information displayed when the product has been picked up and the second sales promotion information displayed when the product has been returned. Details of the display device sales promotion information will be described later.

The storage unit 420 has a function of storing programs and data necessary for the control unit 410 to operate the server 100. The storage unit 420 is realized, for example, by a read-only memory (ROM), a random-access memory (RAM), a flash memory, a hard disk drive (HDD), or the like. The storage unit 420 holds the sales promotion information database 421 that mainly defines sales promotion information to be displayed for each product, timings at which the sales promotion information is displayed, targets of the sales promotion information, and the like. Details of the sales promotion information database 421 will be described later.

Figure 5:
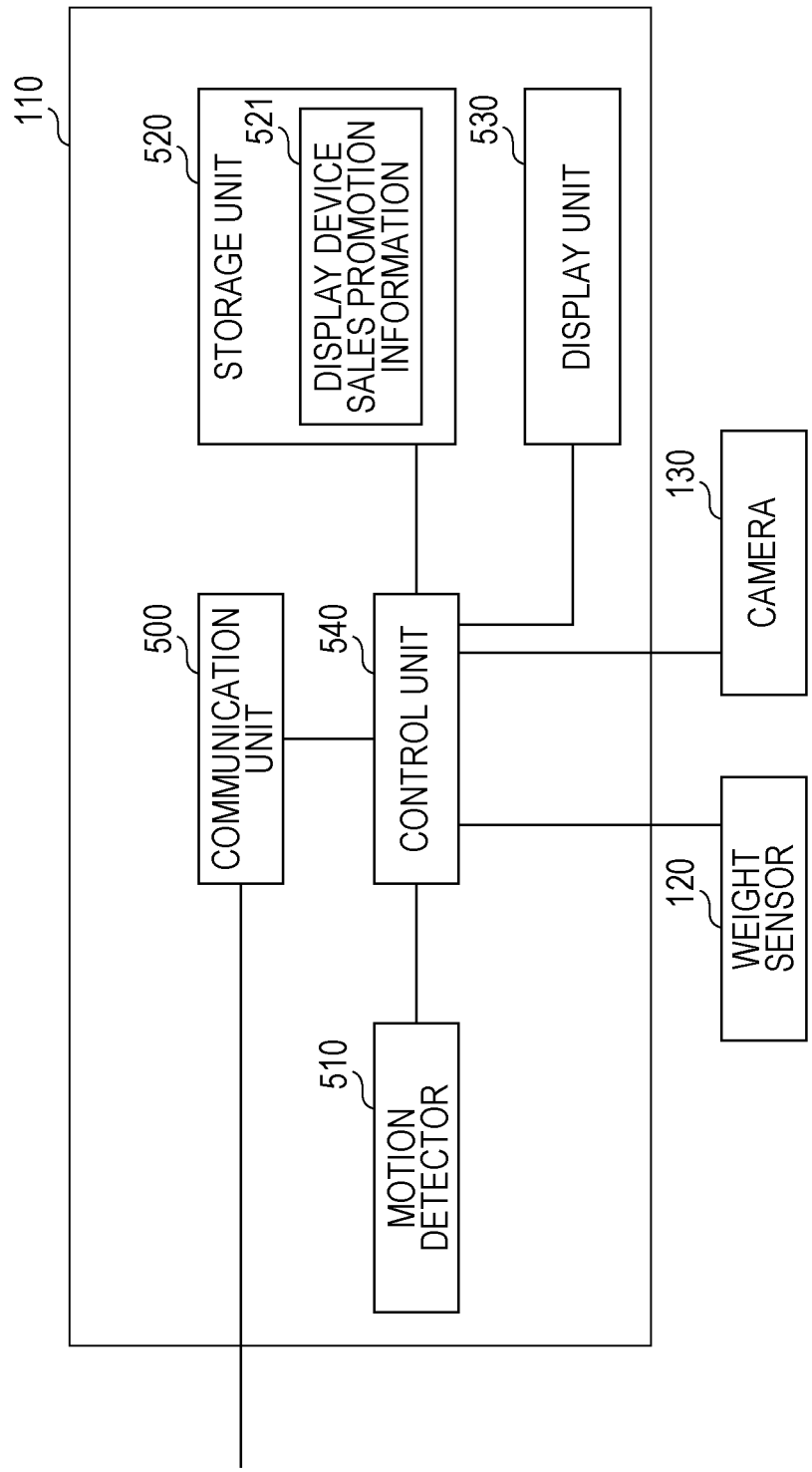
FIG. 5 is a diagram illustrating function blocks of a display device.

FIG. 5 is a functional block diagram illustrating the functional configuration of each display device 110.

As illustrated in FIG. 5, each display device 110 includes a communication unit 500, a motion detector 510 (first motion detector), a storage unit 520, a display unit 530, and a control unit 540.

The communication unit 500 has a function of communicating with the server 100 through the network 140. More specifically, the communication unit 500 has a function of modulating data specified by the control unit 540 in accordance with a certain communication scheme and transmitting modulated signals to a server 100 specified by the control unit 540. The communication unit 500 also has a function of receiving signals transmitted from the server 100 through the network 140, demodulating received data in accordance with the certain communication scheme, and transmitting the demodulated data to the control unit 540. Here, the communication unit 500 mainly transmits a sales promotion information request and, as a result, receives display device sales promotion information from the server 100.

The motion detector 510 is a sensor that detects whether any person is present around the display device 110 and realized, for example, by an infrared sensor, an ultrasonic wave sensor, or the like. The motion detector 510 has a function of, upon detecting any person around the display device 110, notifying the control unit 540 of the presence of a person and a function of, upon detecting that the person has gone away from the display device 110, notifying the control unit 540 of absence of any person. The motion detector 510 detects whether any person is present in front of (a side on which a person can see a screen of the display device 110) the display device 110, and a range in which the motion detector 510 detects a person may be changed by adjusting the sensitivity of the motion detector 510. The detection range of the motion detector 510 may be set such that the motion detector 510 detects a person in the predetermined range.

The storage unit 520 has a function of storing programs and data necessary for the control unit 540 to operate the display device 110. The storage unit 520 is realized, for example, by a ROM, a RAM, a flash memory, an HDD, or the like. The storage unit 520 mainly holds sales promotion information to be displayed by the display device 110, the sales promotion information being obtained from the server 100. Details of the sales promotion information will be described later. In addition, the storage unit 520 holds information regarding the weights of products arranged on display shelves. The weight of a product might be constant or varies to a certain extent depending on the type of product. The storage unit 520 may hold a plurality of weight ranges in consideration of a case in which a plurality of pieces are picked up at once. If a plurality of pieces have been picked up or returned at once, the event may be detected by determining whether there has been a change in weight corresponding to a multiple of the stored weight of a piece, instead of storing a plurality of weight ranges.

The display unit 530 is a display and realized by a liquid crystal display (LCD) or the like. The display unit 530 has a function of displaying sales promotion information specified by the control unit 540.

The control unit 540 is a processor and has a function of controlling the components of the display device 110 by executing programs stored in the storage unit 420. The control unit 540 mainly has the following functions. First, the control unit 540 has a function of causing the communication unit 500 to transmit a sales promotion information request, with which the display device 110 requests the server 100 to transmit sales promotion information regarding a corresponding product. Next, the control unit 540 has a function of recording display device sales promotion information 521 transmitted from the server 100 in the storage unit 520. Here, the display device sales promotion information 521 received from the server 100 includes the first sales promotion information and the second sales promotion information, which can be distinguished from each other. Details of the display device sales promotion information 521 will be described later.

In addition, the control unit 540 has a function of determining, in accordance with a change in weight transmitted from the weight sensor 120, whether the product has been picked up from the display shelf or the product has been returned. The control unit 540 has a function of, in accordance with a result of the determination, reading necessary sales promotion information from the storage unit 520 and displaying the sales promotion information. Each time a weight is transmitted from the weight sensor 120, the control unit 540 records the value in the storage unit 520.

At this time, the control unit 540 analyzes an image transmitted from the corresponding camera 130 and estimates the attributes (for example, gender, age, and a particular identity) of a customer who has picked up the product. The control unit 540 uses results of the estimation to identify sales promotion information to be displayed and causes the display unit 530 to display the sales promotion information. For example, if different pieces of sales promotion information have been set for men and women for the product and it has been determined as a result of the image analysis that the customer is a man, the sales promotion information for men is identified and displayed by the display unit 530. If no sales promotion information according to a particular target is prepared for the product, identification of a customer through the image analysis need not be executed.

More specifically, in the display of sales promotion information, the control unit 540 calculates a difference from a previously received weight, each time the control unit 540 has received a measured weight from the weight sensor 120. The control unit 540 then determines, using the absolute value of the difference, whether the calculated difference falls within a range of values stored as the weight of a product corresponding to the display device 110. Here, the control unit 540 subtracts the newly received weight value from the previous weight. If the difference is a positive value, the control unit 540 determines that the product has been picked up, and if the difference is a negative value, the control unit 540 determines that the product has been returned.

If the absolute value of the difference in weight falls within the stored weight range and the difference is a positive value, the control unit 540 reads the first sales promotion information corresponding to the product from the display device sales promotion information 521 stored in the storage unit 520 and causes the display unit 530 to display the first sales promotion information. If the absolute value of the difference in weight falls within the stored weight range and the difference is a negative value, the control unit 540 reads the second sales promotion information corresponding to the product from the display device sales promotion information 521 stored in the storage unit 520 and causes the display unit 530 to display the second sales promotion information.

The weight sensor 120 is provided at a position (for example, a display shelf) at which a corresponding product is arranged and has a function of sequentially (for example, every second) transmitting weights measured thereby to the display device 110. The weight sensor 120 is capable of calculating a total weight even if a plurality of pieces of the same product or a plurality of pieces of different products are arranged at the display shelf.

The camera 130 has a function of sequentially capturing images and transmitting captured images to the display device 110. As illustrated in FIGS. 1 and 2, the camera 130 is provided in order to enable the display device 110 to obtain information (gender, a particular identity, approximate age, and the like) regarding customers who pick up or return a corresponding product.

Data

The sales promotion information database 421 held by the server 100 will be described.

FIG. 6 is a conceptual diagram illustrating the data configuration of the sales promotion information database 421. As illustrated in FIG. 6, the sales promotion information database 421 is information in which product codes 601, targets 602, first sales promotion information 603, and second sales promotion information 604 are associated with one another.

Each product code 601 is identification information unique to each product managed by the information providing system.

Each target 602 is information indicating a target (persons) for which sales promotion information regarding the product indicated by the corresponding product code 601 is displayed.

Each piece of the first sales promotion information 603 is an identifier for sales promotion information to be displayed by the display device 110 when the product indicated by the corresponding product code 601 has been picked up from a position at which the product is arranged. Although not illustrated in the sales promotion information database 421, sales promotion information (data to be displayed) corresponding to the identifiers is also stored.

Each piece of the second sales promotion information 604 is an identifier for sales promotion information to be displayed by the display device 110 when the product indicated by the corresponding product code 601 has been picked up from a position at which the product is arranged and then returned. Although not illustrated in the sales promotion information database 421, sales promotion information (data to be displayed) corresponding to the identifiers is also stored.

The display device sales promotion information 521 held by the display device 110 is a part of the sales promotion information database 421. The display device 110 stores sales promotion information (portions illustrated in FIG. 6 corresponding to the product code included in the sales promotion information request transmitted from the display device 110 to the server 100 and data to be displayed, namely the first sales promotion information and the second sales promotion information, indicated by the product code) regarding the corresponding product in a format illustrated in FIG. 6. As a result, the display device 110 can properly display the first sales promotion information when the product has been picked up and the second sales promotion information when the product has been returned.

Since the display device 110 holds the display device sales promotion information illustrated in FIG. 6, the display device 110 can identify the first sales promotion information and the second sales promotion information corresponding to a customer (target) whose image has been captured by the camera 130 and who has been identified and display the first sales promotion information and the second sales promotion information.

Operations

Operations performed by the display device 110 and the server 100 will be described with reference to FIGS. 7 to 9.

Figure 7:
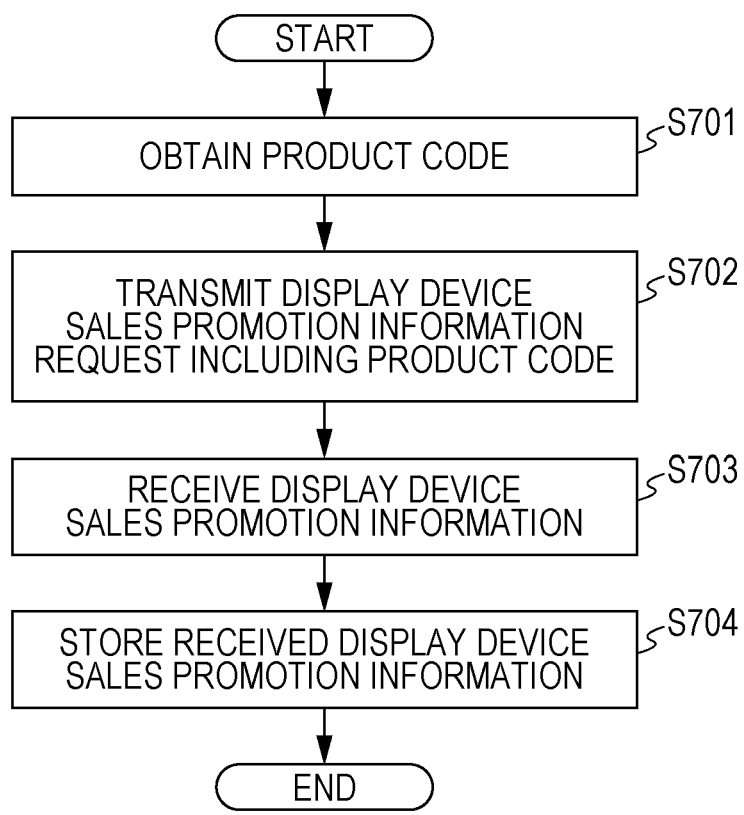
FIG. 7 is a flowchart illustrating an operation performed by the display device to obtain sales promotion information.

FIG. 7 is a flowchart illustrating an operation performed by the display device 110 to obtain sales promotion information from the server 100.

As illustrated in FIG. 7, the control unit 540 of the display device 110 obtains the product code of the corresponding product (step S701). The product code of the product corresponding to the display device 110 is input by an operator or the like to the storage unit 520 in advance.

As a result, the control unit 540 requests the communication unit 500 to transmit a display device sales promotion information request to request sales promotion information including the obtained product code for the display device 110. The communication unit 500 transmits the display device sales promotion information request to the server 100 in accordance with the request (step S702).

The communication unit 500 receives the display device sales promotion information transmitted from the server 100 in response to the transmitted display device sales promotion information request and transmits the display device sales promotion information to the control unit 540 (step S703). As described above, the display device sales promotion information includes data regarding only portions of data having the configuration illustrated in FIG. 6 corresponding to the product corresponding to the display device 110 and data regarding sales promotion information to be displayed.

The control unit 540 records the transmitted display device sales promotion information in a region of the storage unit 520 for storing sales promotion information (step S704).

Thus, the display device 110 can obtain sales promotion information to be displayed. The operation is executed at a predetermined timing (for example, an hour before opening the store or a timing specified by the operator).

Figure 8:
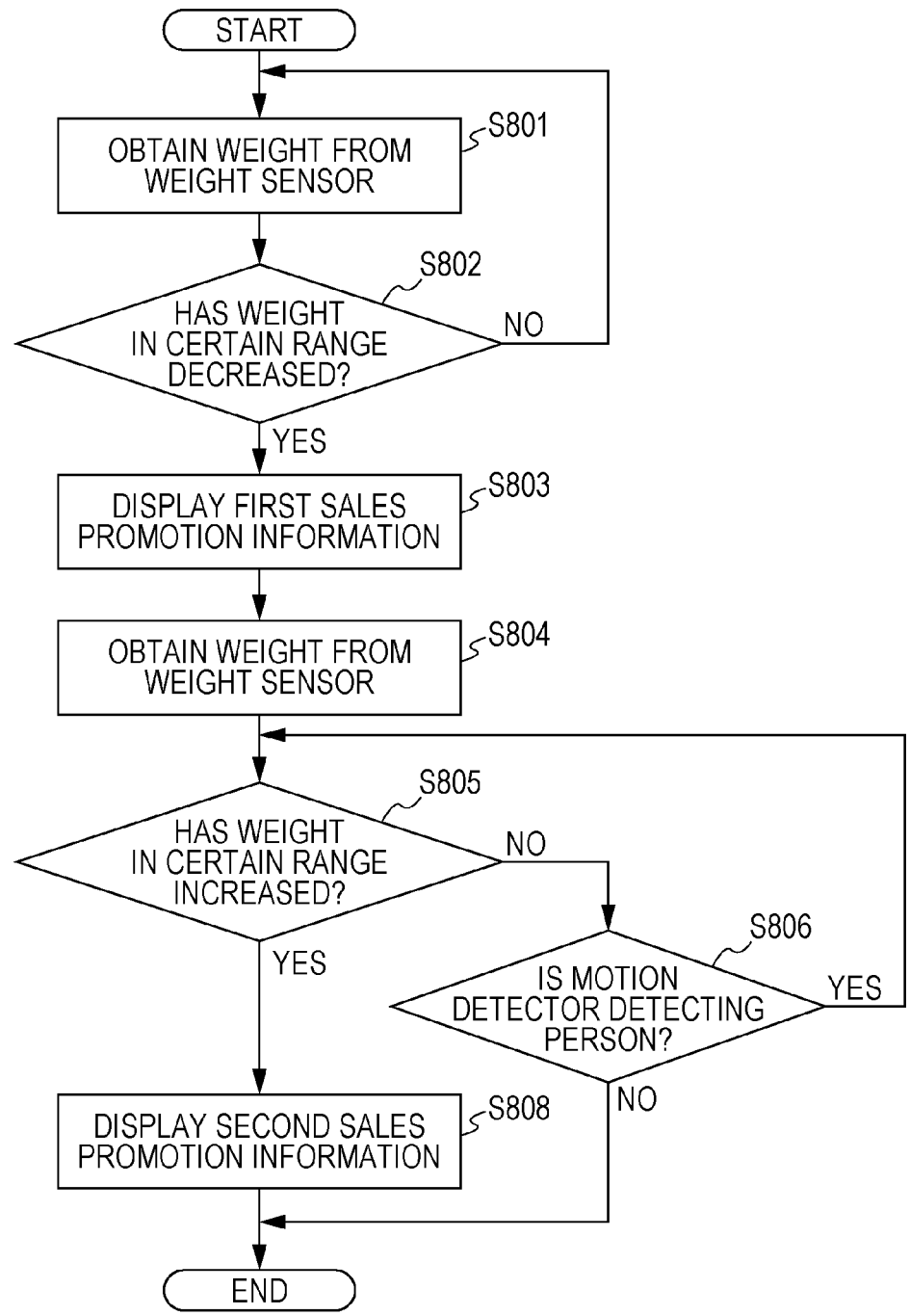
FIG. 8 is a flowchart illustrating an operation performed by the display device to display the sales promotion information.

FIG. 8 is a flowchart illustrating an operation performed by the display device 110 to display sales promotion information. FIG. 8 illustrates a process until a product that has been picked up is returned or taken away by the customer to buy the product. The process is repeatedly executed as necessary.

As illustrated in FIG. 8, the control unit 540 of the display device 110 receives information regarding a measured weight from the weight sensor 120 (step S801).

Upon receiving the information regarding the measured weight from the weight sensor 120, the control unit 540 reads, from the storage unit 520, previously received weight information and subtracts the read weight from the measured weight. The control unit 540 then determines (judges) on the basis of a difference whether the weight has decreased by a value within a predetermined range (step S802).

If the weight has not decreased by a value within a predetermined range (NO in step S802), the process returns to step S801.

If the weight has decreased by a value within a predetermined range (YES in step S802), the product corresponding to the display device 110 has been picked up. The control unit 540 identifies the first sales promotion information corresponding to the product using the display device sales promotion information 521 and reads the first sales promotion information from the storage unit 520. At this time, if the targets 602 have been specified for the product, the control unit 540 obtains an image from the camera 130, conducts an image analysis, estimates the attributes of a customer included in the image, and identifies the first sales promotion information using the estimated attributes. More specifically, the control unit 540 searches the display device sales promotion information 521 regarding the corresponding product for whether the targets 602 have been specified (whether there is no specification). If the targets 602 have been specified, the control unit 540 conducts an image analysis on the image obtained from the camera 130 and identifies the attributes (gender, approximate age, and the like) of the customer. The control unit 540 then determines whether the identified attributes match any of the targets 602 in the display device sales promotion information 521 and reads the first sales promotion information corresponding to the identified target 602. The control unit 540 then displays the read first sales promotion information on the display unit 530 (step S803).

Next, the control unit 540 again receives information regarding a measured weight from the weight sensor 120 (step S804).

Upon receiving the information regarding the measured weight from the weight sensor 120, the control unit 540 reads, from the storage unit 520, the previously received weight information and subtracts the read weight from the measured weight. The control unit 540 then determines (detects) on the basis of the difference whether the weight has increased by a value within the predetermined range (step S805).

If the weight has not increased by a value within the predetermined range (NO in step S805), the control unit 540 determines whether the motion detector 510 is detecting a person (step S806).

If the motion detector 510 is detecting a person (YES in step S806), the person who has picked up the product might be still in front of the display shelf. In this case, the process returns to step S805. On the other hand, if the motion detector 510 is not detecting a person (NO in step S806), the person who has picked up the product has taken away the product to buy the product. In this case, the process ends.

If the weight has increased by a value within the predetermined range in step S805 (YES in step S805), the control unit 540 identifies the second sales promotion information corresponding to the product using the display device sales promotion information 521 and reads the second sales promotion information from the storage unit 520. At this time, if the targets 602 have been specified for the product, the control unit 540 obtains an image from the camera 130, conducts an image analysis, estimates the attributes of the customer included in the image, and identifies the second sales promotion information using the estimated attributes. The method for identifying the second sales promotion information is the same as that for identifying the first sales promotion information. The control unit 540 then causes the display unit 530 to display the read second sales promotion information (step S808) and ends the process.

Lastly, an operation performed by the server 100 to transmit sales promotion information to the display device 110 will be described.

Figure 9:
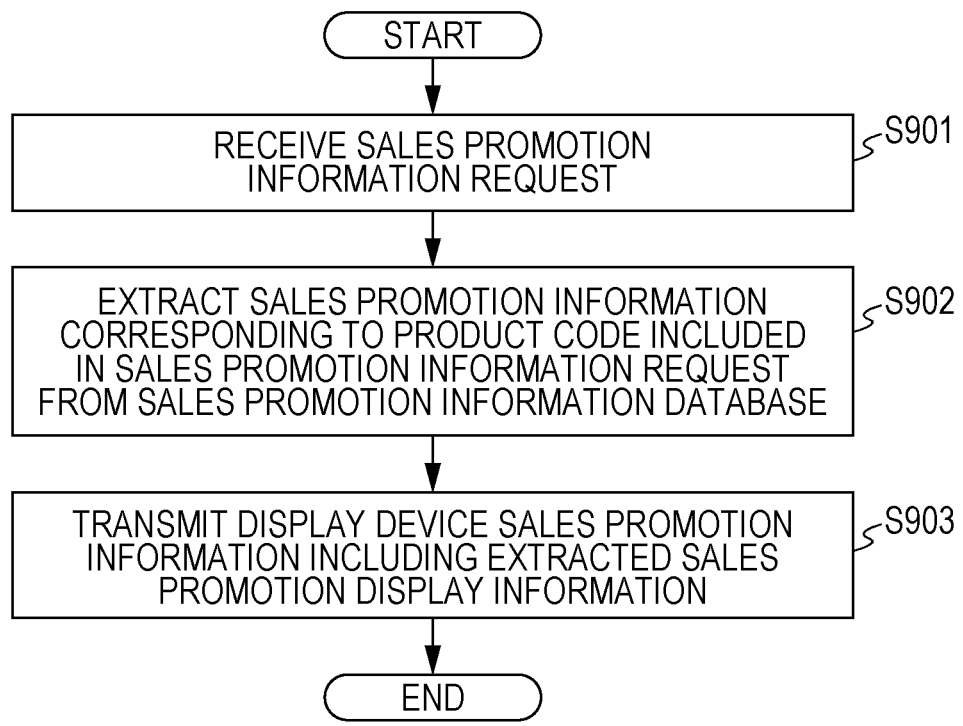
FIG. 9 is a flowchart illustrating an operation performed by the server to provide the sales promotion information.

As illustrated in FIG. 9, the communication unit 400 of the server 100 receives a display device sales promotion information request transmitted from the display device 110 (step S901). The communication unit 400 transmits the received display device sales promotion information request to the control unit 410.

Upon receiving the display device sales promotion information request, the control unit 410 extracts a product code included in the display device sales promotion information request. The control unit 410 then reads sales promotion information corresponding to the extracted product code from the sales promotion information database 421. In addition, the control unit 410 also reads actual data regarding the first sales promotion information and the second sales promotion information corresponding to the read sales promotion information (step S902).

The control unit 410 then causes the communication unit 400 to transmit the extracted sales promotion information as display device sales promotion information (step S903).

The operation performed by the server 100 to transmit sales promotion information has been described.

EXAMPLES OF SALES PROMOTION INFORMATION

The information providing system in the present disclosure displays different pieces of sales promotion information at least twice, namely when the product has been picked up from the display shelf and when the product has been returned. That is, there are more opportunities to display various pieces of sales promotion information. There are various types of sales promotion information such as one that explains the quality of the product, one that explains a discount, one that indicates a popularity ranking in the store, one that indicates that a combination purchase of the product and another product is a bargain, and one that indicates the number of favorable votes for the product received through a social networking service (SNS) or the like. These pieces of sales promotion information are recorded in the server 100 by the operator of the information providing system.

Here, examples of the sales promotion information and a method for displaying the sales promotion information will be described.

First Examples

Figure 10A:
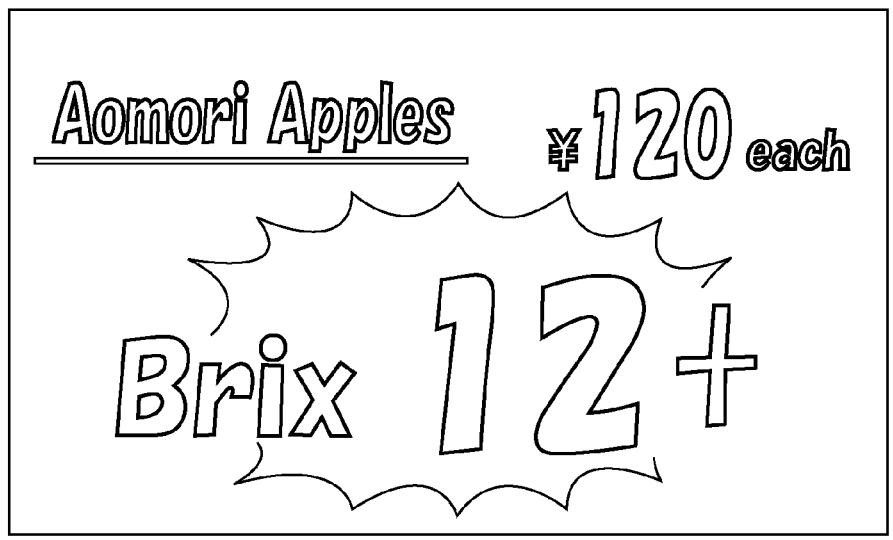
FIGS. 10A and 10B are diagrams illustrating examples of the sales promotion information.
Figure 10B:

The types of sales promotion information include one that tries to directly explain the virtues of the product to the customers to stimulate the desire to buy the product. FIGS. 10A and 10B illustrate examples.

Here, apples will be taken as an example of the product. FIG. 10A illustrates an example of sales promotion information that explains the characteristics of the apples. The display device 110 displays sales promotion information that emphasizes sweetness (Brix), which is one of the great virtues of the apples as a product.

The display device 110 may display sales promotion information that explains another virtue of the apples as a product, instead, as illustrated in FIG. 10B. As illustrated in FIG. 10B, the sales promotion information may explain, for example, how rare the product is. By evoking a feeling of exclusivity, the customer's desire to buy the product can be stimulated.

The sales promotion information illustrated in FIGS. 10A and 10B may be used as the first sales promotion information or may be used as the second sales promotion information in the first examples.

By displaying the sales promotion information that explains the virtues of the product in various ways, the customer's desire to buy the product can be stimulated.

In addition, as illustrated in FIGS. 10A and 10B, for example, the customer's desire to buy the product can be further stimulated by displaying "Aomori" in the first sales promotion information and then displaying, in the second sales promotion information, "the xx town", which is a renowned production area for apples in Aomori Prefecture. Alternatively, the customer's desire to buy the product can be further stimulated by displaying the explanation of the apples in the first sales promotion information and then displaying "ONLY NOW", which indicates the season for the apples, in the second sales promotion information. Thus, the second sales promotion information may be information associated with the first sale promotion information.

Second Examples

Figure 11A:
FIGS. 11A and 11B are diagrams illustrating examples of the sales promotion information.
Figure 11B:
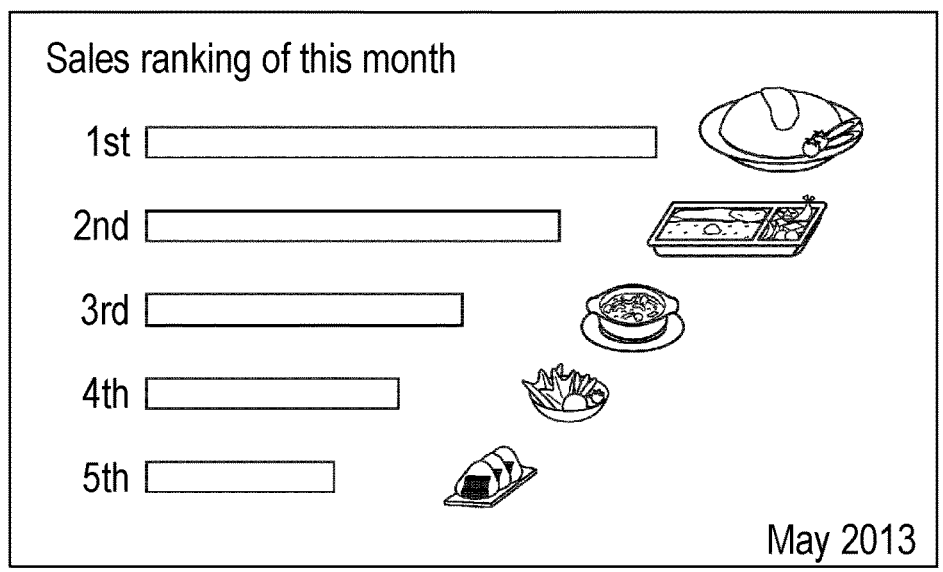

In another set of examples of the sales promotion information, the customer's desire to buy the product is stimulated by showing the popularity of the product. FIGS. 11A and 11B illustrate examples.

In sales promotion information illustrated in FIG. 11A, the popularity of the product in the store is shown. Thus, a popular product can stimulate the customer's desire to buy the product even if the customer has not been interested in the product.

Alternatively, as illustrated in FIG. 11B, the customer's desire to buy the product can be stimulated by displaying sales promotion information in the form of a monthly sales ranking.

Thus, if the product is popular, it is effective to display sales promotion information indicating the popularity of the product.

The sales promotion information illustrated in FIGS. 11A and 11B may be used as either the first sales promotion information or the second sales promotion information.

Third Examples

Another set of examples of the sales promotion information will be described. The sales promotion information may promote not only the picked-up item but also another product to the customer.

Figure 12A:
FIGS. 12A and 12B are diagrams illustrating examples of the sales promotion information.

For example, if the picked-up item is a box lunch, the customer's desire to buy the product can be stimulated by, as illustrated in FIG. 12A, displaying a drink along with the box lunch and a bargain price at a time when the two products are sold together.

Figure 12B:
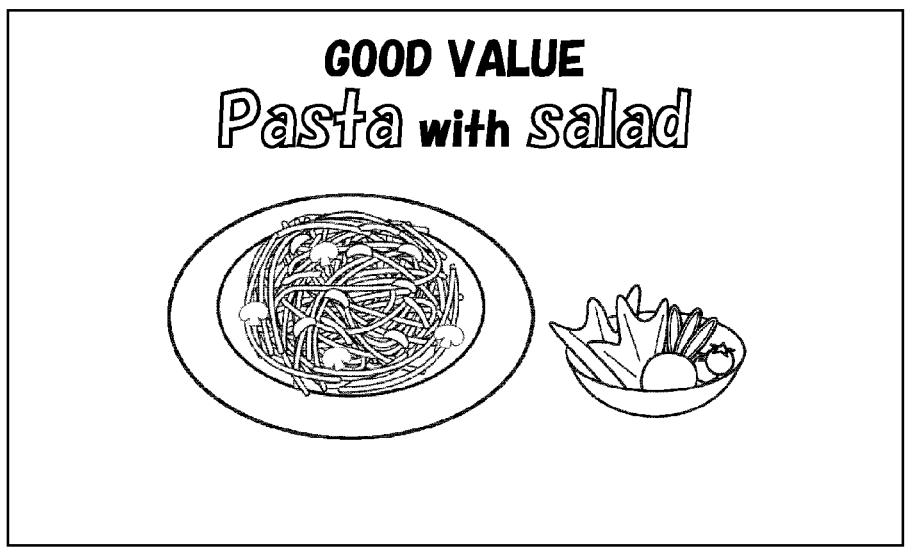

Alternatively, as illustrated in FIG. 12B, if the picked-up item is a pasta, a salad may be promoted as a bargain product.

Thus, it is effective to display sales promotion information indicating a bargain price or a higher virtue at a time when the picked-up item is sold with another product.

Although examples in which the picked-up item is sold with another product have been described above, sales promotion information regarding only a product different from the picked-up item may be used as the first sales promotion information or the second sales promotion information. For example, if the picked-up item is bread, sales promotion information regarding jam or batter may be used as the first sales promotion information or the second sales promotion information. Even when a product different from the picked-up item is promoted, an effective sales promotion effect can be expected if the product is highly relevant to the picked-up item.

The sales promotion information regarding the set products illustrated in FIGS. 12A and 12B and the sales promotion information regarding only a product different from the picked-up item may be used either as the first sales promotion information or as the second sales promotion information.

That is, sales promotion information regarding the picked-up item may be displayed as the first sales promotion information, and sales promotion information regarding an alternative product different from the picked-up item may be displayed as the second sales promotion information. As a result, even if the sales promotion information has failed to stimulate the customer's desire to buy the picked-up item, it becomes possible to promote another product.

On the other hand, sales promotion information regarding a product different from the picked-up item may be displayed as the first sales promotion information, and sales promotion information regarding the picked-up item may be displayed as the second sales promotion information. As a result, it becomes possible to display, for the customer, sales promotion information regarding a product different from the picked-up item to promote the other product, whereas, if the customer has returned the picked-up item, it becomes possible to display sales promotion information regarding the returned product to attract the customer's attention to the product that he/she has just returned.

Fourth Examples

Another set of examples of the sales promotion information will be described. The sales promotion information may be related to the price of the product to stimulate the customer's desire to buy the product.

Figure 13A:
FIGS. 13A and 13B are diagrams illustrating examples of the sales promotion information.
Figure 13B:

For example, as illustrated in FIGS. 13A and 13B, the sales promotion information may indicate a bargain price or a suggestion of a discount on a bulk purchase.

In the case of such sales promotion information, by displaying second sales promotion information indicating a price lower than a price indicated by the first sales promotion information, the customer's desire to buy the product can be stimulated more effectively.

For example, as illustrated in FIG. 13A, first, sales promotion information indicating that a bargain price is offered on a bulk purchase of three is displayed as the first sales promotion information.

Next, for example, as illustrated in FIG. 13B, sales promotion information indicating that if the customer gets a coupon, the customer can get a further discount is displayed as the second sales promotion information.

As a result, the customer's desire to buy the product can be stimulated. Alternatively, for example, first sales promotion information indicating that the customer can get a discount by simply buying the product may be displayed first, and then the sales promotion information illustrated in FIG. 13A indicating a further discount may be displayed as the second sales promotion information.

Fifth Examples

In addition, the following sales promotion information may be used insofar as the customer's desire to buy the product can be stimulated.

Figure 14A:
FIGS. 14A and 14B are diagrams illustrating examples of the sales promotion information.
Figure 14B:
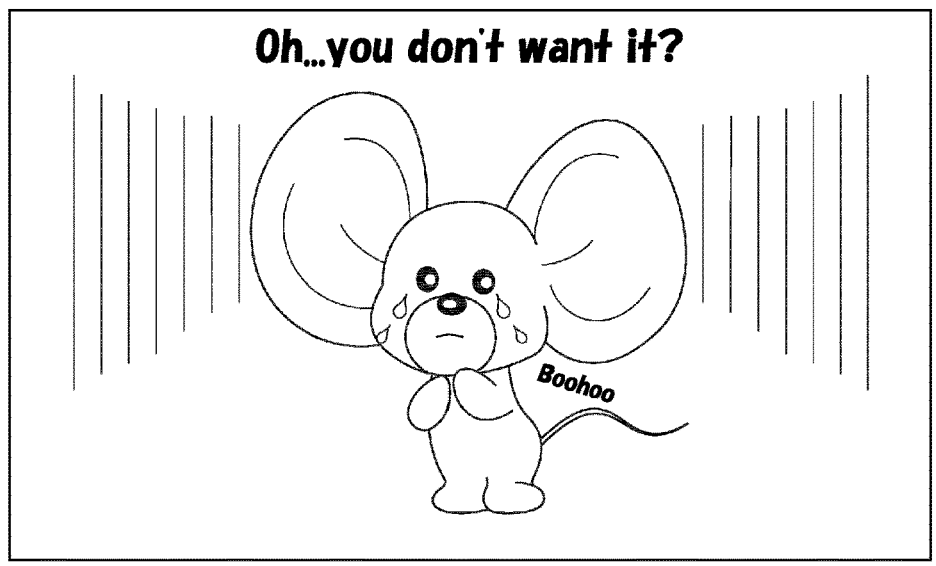

For example, as illustrated in FIGS. 14A and 14B, a mascot may talk to the customer cutely so that the customer's desire to buy the product is stimulated.

For example, as illustrated in FIG. 14A, when the product has been picked up, first sales promotion information showing the mascot being happy with a possible purchase is displayed. Next, as illustrated in FIG. 14B, if the product has been returned, second sales promotion information showing the mascot being sad about the returning of the product may be displayed.

Although a case in which a mascot is used has been described here, a celebrity such as an actor or a singer may be used instead of the mascot.

Because sales promotion information appealing to the customer is thought to vary depending on the gender and the age of the customers, sales promotion information according to the gender and the age may be prepared and used as the first sales promotion information or the second sales promotion information. For example, sales promotion information including a simple, frank message may be prepared for men, and sales promotion information including a joyful, lively message may be prepared for women and displayed as necessary. As described above, the attributes (for example, gender) of the customer are estimated by analyzing an image including the customer.

Thus, various patterns of the first and second sales promotion information are possible. Furthermore, by combining different types of sales promotion information (for example, sales promotion information indicating the virtues of the product as in the first examples and sales promotion information indicating the popularity of the product as in the second examples) as the first and second sales promotion information, the customer's desire to buy the product can be further stimulated, thereby making it possible to reduce loss in opportunities to sell the product. If a plurality of different pieces of sales promotion information are associated with one product, one of the pieces of sales promotion information may be randomly selected and displayed.

Modifications

Although the information providing system in the present disclosure has been described in the above embodiment, the present invention is not limited to this. Various modifications included in the spirit of the present disclosure will be described hereinafter.

(1) In the embodiment, whether the product has been picked up from the display shelf and whether the product has been returned are detected by the weight sensor 120.

A method other than the use of the weight sensor 120, however, may be used, insofar it can be detected using the method that the product has been picked up from the display shelf and that the product has been returned.

For example, a camera is installed in the store in order to sequentially capture images of an arrangement state of each product. The camera sequentially (for example, every second) captures images and transmits the images to the corresponding display device 110. The control unit 540 of the display device 110 compares a received image and a previously received image using an image analysis technique and performs detection on the basis of whether there has been a change. That is, each time the control unit 540 of the display device 110 has received an image, the control unit 540 performs object detection on the image and compares objects between the received image and the previously received image.

Thus, whether the product has been picked up from the display shelf and whether the product has been returned may be determined using the image analysis technique.

Alternatively, an integrated circuit (IC) tag may be provided for each product and whether each product has been picked and whether each product has been returned may be detected by detecting the spatial position of the IC tag in the store.

Alternatively, detection accuracy may be increased by combining a plurality of methods.

(2) In the embodiment, each display device 110 obtains sales promotion information from the server 100. This mode, in which each display device 110 obtains sales promotion information from the server 100, is effective when the same products are dealt with by a plurality of stores.

Each display device 110, however, need not obtain sales promotion information from the server 100 if each display device 110 can appropriately display sales promotion information when the corresponding product has been picked up and when the corresponding product has been returned.

For example, each display device 110 may include an input mechanism for inputting sales promotion information, and the operator may store sales promotion information to be displayed in each display device 110. In this case, the server 100 need not be provided.

(3) In the embodiment, the display device 110 determines which type of sales promotion information is to be displayed and then displays the determined type of sales promotion information. However, The server 100 may determine the type of sales promotion information to be displayed instead of the display device 110, insofar as the server 100 can appropriately select the sales promotion information to be displayed.

More specifically, when the weight sensor 120 has detected a decrease in weight, the display device 110 requests the server 100 to transmit sales promotion information.

The server 100 selects, in response to the request, sales promotion information regarding a product corresponding to the display device 110 that has transmitted the request and transmits the selected first sales promotion information to the display device 110.

The display device 110 then displays the received first sales promotion information.

When the product has been returned to the display shelf, the display device 110 displays the second sales promotion information through the same process.

Thus, the display device 110 may obtain sales promotion information to be displayed by requesting the server 100 to transmit the sales promotion information as necessary. In this case, the display device 110 need not hold necessary sales promotion information, thereby reducing the amount of memory used in the display device 110 compared to the case described in the embodiment.

(4) Although the camera 130 sequentially captures images and transmit the images to the display device 110 in the embodiment, the camera 130 need not sequentially capture images insofar as images can be captured at timings at which buyers pick up the product.

That is, when the motion detector 510 of the display device 110 has detected a person, the display device 110 instructs the camera 130 to capture an image. Upon receiving the instruction, the camera 130 captures an image and transmits the captured image to the display device 110. While receiving image capture instructions, the camera 130 sequentially captures images, and when the motion detector 510 is no longer detecting a person, the display device 110 instructs the camera 130 to stop capturing images.

In doing so, the camera 130 need not constantly operate, thereby saving power used in the information providing system.

(5) In the embodiment, sales promotion information is displayed twice, namely when a customer has picked up a product and when the customer has returned the product.

The number of times that sales promotion information is displayed is not limited to twice, but the display device 110 may display sales promotion information three times or more when the display device 110 has a configuration described below. In this case, identifiers of third sales promotion information are associated in the sales promotion information database 421 and the display device sales promotion information 521, and the third sales promotion information indicated by the identifiers are stored in the storage unit 420 or the storage unit 520.

More specifically, the display device 110 includes a timer portion for measuring time, and the timer portion begins to measure time when it has been detected that a product has been picked up from a display shelf. If a certain period of time has elapsed since the product was picked up and if the motion detector 510 is still detecting a person (that is, if it has been determined that any person is present around the display shelf), the display device 110 switches the displayed first sales promotion information to the third sales promotion information. If the product has been returned to the display shelf thereafter, the display device 110 switches the displayed third sales promotion information to the second sales promotion information.

Although the display device 110 switches the displayed first sales promotion information to the third sales promotion information in the above description, the sales promotion information to be displayed may be the second sales promotion information, not the third sales promotion information, that is, the display device 110 may switch the displayed first sales promotion information to the second sales promotion information. If the product has been returned to the display shelf thereafter, the display device 110 may switch the displayed second sales promotion information to the third sales promotion information. The third sales promotion information is information different from the first sales promotion information and the second sales promotion information.

In doing so, the number of opportunities to display sales promotion information for the customer can be increased by one, thereby further stimulating the customer's desire to buy the product.

Alternatively, even when the number of opportunities to display sales promotion information is two, the customer's desire to buy the product can be stimulated by displaying various pieces of sales promotion information. That is, a plurality of pieces of sales promotion information are prepared and displayed in accordance with time elapsed since the product was picked up. In other words, the sales promotion information to be displayed may change in accordance with how long the customer considers whether to buy the product. For example, if the customer has been considering for a long time, that is, if, before the customer returns the product, a certain period of time (for example, 20 seconds) has elapsed since the customer picked up the product, sales promotion information indicating a bargain price is displayed in order to make one final push. In order to display such sales promotion information, identifiers of fourth sales promotion information are further associated in the sales promotion information database 421 and the display device sales promotion information 521, and the fourth sales promotion information indicated by the identifiers are stored in the storage unit 420 or the storage unit 520.

Thus, by displaying sales promotion information that takes into consideration the psychology of the customer, the customer's desire to buy the product can be stimulated more effectively.

(6) In the embodiment, the control unit 540 of the display device 110 detects that a product has been picked up or that a product has been returned on the basis of whether a change in weight matches a weight stored in advance or whether a change in weight falls within a stored weight range. In this case, it is possible to prevent sales promotion information from being displayed when an item irrelevant to the arranged product has been picked up or returned, which is advantageous. In order to simplify the control, however, the control unit 540 may determine that the product has been picked up or returned simply on the basis of whether the weight has decreased or increased.

(7) Although not particularly described in the embodiment, the server 100 may include an input mechanism for inputting new sales promotion information. For example, the server 100 receives sales promotion information from a personal computer (PC) or the like connected to the network 140 through the network 140. The control unit 410 may have a function of adding the received new sales promotion information to the sales promotion information database 421.

Furthermore, sales promotion information need not be input through the network 140 but may be directly input to the server 100. For example, the server 100 may include a Universal Serial Bus (USB) terminal or a terminal to which a recording medium such as a flash memory can be connected, such as a memory card slot. A flash memory in which new sales promotion information is recorded may be connected to the server 100, and the control unit 410 may be reads the new sales promotion information from the flash memory and add the new sales promotion information to the sales promotion information database 421.

Alternatively, a drawing tool for drawing sales promotion information may be installed on the server 100. The operator may create sales promotion information on the server 100, and the control unit 410 may add the created new sales promotion information to the sales promotion information database 421.

(8) Although one display device 110 is used for one product in the embodiment, the number of display devices 110 used for the products is not limited to this. One display device 110 may be used for a plurality of products, insofar as the display device 110 can appropriately display sales promotion information for the corresponding products.

For example, assume that a plurality of products A, B, and C are arranged on the weight sensor 120. The display device 110 individually stores the weight of each product. The display device 110 then identifies a product that has been picked up on the basis of the value of a change in the weight detected by the weight sensor 120 and displays sale promotion information corresponding to the product. In this case, the weights of the products A, B, and C are preferably different from one another, but if the weights are similar to one another, a product that has been picked up or returned may be identified through an image analysis process or the like. For example, a configuration illustrated in FIG. 15 may be used in a mode in which a single display device 110 displays sales promotion information for a plurality of products.

(9) Although the display device 110 obtains necessary sales promotion information by accessing the server 100 in the embodiment, the display device 110 may use another method insofar as the display device 110 can obtain sales promotion information.

For example, sales promotion information may be stored in a flash memory or the like, and the flash memory may be connected to the display device 110. The display device 110 may obtain the sales promotion information from the flash memory. Alternatively, the display device 110 may include a tool for creating sales promotion information, and sales promotion information may be created on the display device 110 using the tool.

(10) Although not illustrated in the embodiment, the information providing system may further include the following configuration.

That is, a camera may be installed around a cash register and capture an image of a buyer. Sales information regarding, for example, whether the buyer has checked sales promotion information at a display shelf, whether the buyer picked up a product after the first sales promotion information is displayed, whether the buyer picked up a product after the second sales promotion information is displayed, and whether the buyer picked up a product after the third sales promotion information is displayed may be collected and transmitted to the server 100. Here, the information to be transmitted may be, for example, a combination of an image (or a moving image) captured by the camera 130 arranged at the display shelf and an image captured by the camera arranged around the cash register. Alternatively, the operator of the information providing system in the store may create, on the basis of this image information, data indicating sales promotion information that has prompted the buyer to buy a product or sales promotion information that has not prompted the buyer to buy a product and transmit the data.

In addition, the display device 110 may transmit the number of times of display of the first sales promotion information and the number of times of display of the second sales promotion information to the server 100 at certain time intervals (for example, every hour or every day). At this time, the number of pieces of a product corresponding to a display device 110 sold in a certain period may be transmitted to the server 100.

The transmission process may be executed by the display device 110, or a server dedicated to collecting sales promotion information may be provided in the store and the server may transmit the sales promotion information to the server 100. Of course, if the number of stores in which the information providing system operates is one, sales promotion information need not be transmitted to the server 100.

Thus, an owner of the store in which the information providing system is provided can recognize how many customers each piece of sales promotion information (first, second, and third sales promotion information and display patterns and types of the first, second and third sales promotion information) has been effective to and what kind of customers each piece of sales promotion information has been effective to. Therefore, more effective sales promotion information and a more effective method for providing the sales promotion information can be explored and reflected in the information providing system. In addition, the information transmitted to the server 100 may be used, for example, to determine the number of pieces of a product to be stocked, the number of pieces of another product to be stocked, and the like.

Figure 15:
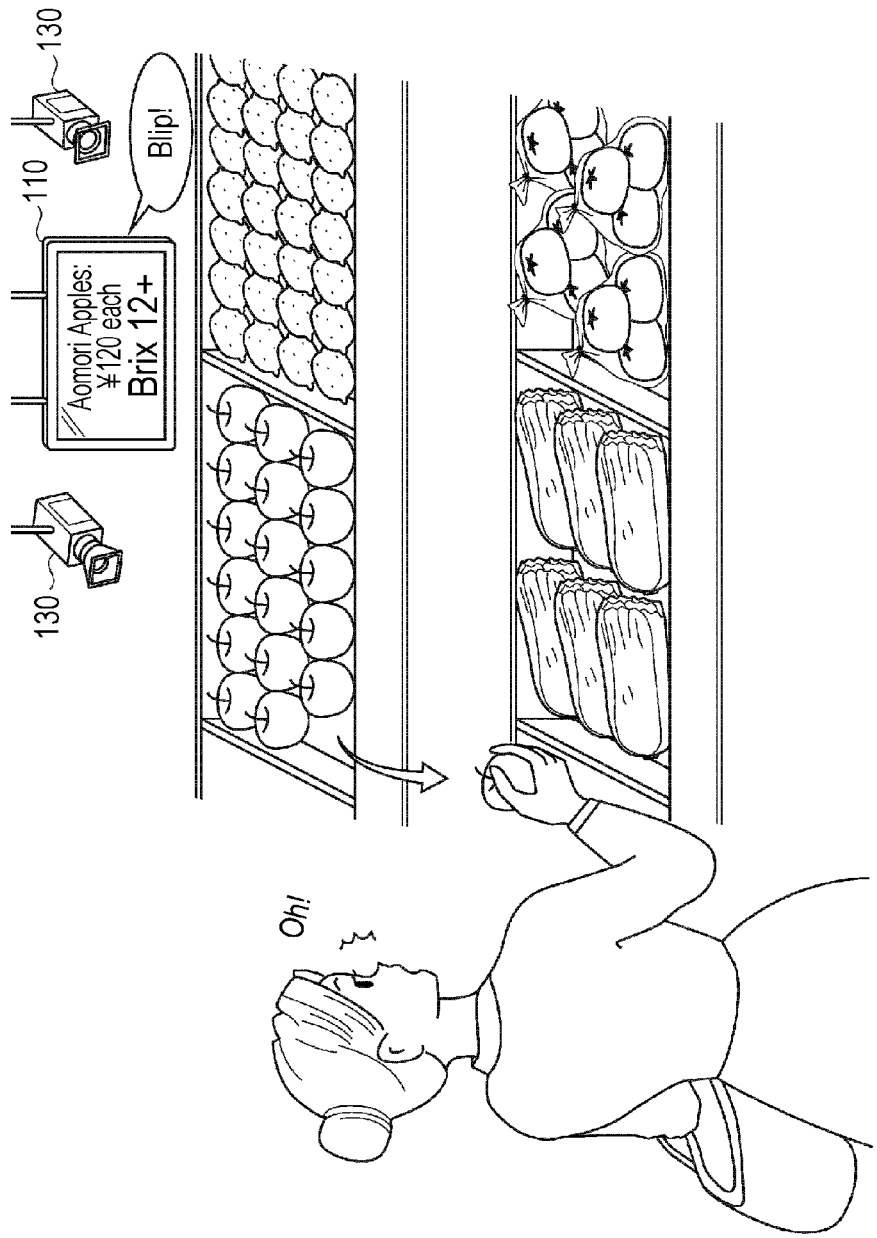
FIG. 15 is a diagram illustrating an example of arrangement of the display device.

(11) In the embodiment, the display device 110 is arranged as close to the corresponding product as possible. This is because it becomes easier to attract the customer's attention when the customer has picked up the product, but if it is difficult to arrange the display device 110 near the product, the display device 110 may be arranged in a range in which the customer can see sales promotion information when the customer has picked up the product. This also holds when the display device 110 is used for a plurality of products as in the modification (8). For example, the display device 110 may be arranged near products as illustrated in FIG. 15.

(12) Although the display device 110 installed in the store displays sales promotion information in the embodiment, the display device 110 need not necessarily be installed in the store. For example, sales promotion information may be transferred to a mobile communication terminal such as a smartphone or a mobile phone owned by a customer and displayed, insofar as the customer who has picked up a product can be uniquely identified. A customer may be identified by, for example, holding face information regarding the customer in advance and identifying the customer on the basis of a matching degree between the face information and a customer's face included in an image captured by the camera 130. Alternatively, a communication terminal such as an access point may be installed near a product, and data regarding sales promotion information may be transmitted to a terminal within a range in which communication with the access point is possible though near field communication (NFC) and displayed.

In this case, the access point has the same function (a function of identifying sales promotion information to be displayed when a product has been picked up or returned) as that of the control unit 540 of the display device 110 according to the embodiment and may further have a function of transmitting the identified sales promotion information to be displayed to a terminal of a person who is close to the access point. The access point may include a display like the display device 110, or need not include a display. The motion detector may be included in the access point or may be installed at a position different from the access point, insofar as the motion detector can detect an approaching person around a product and communicate with the access point.

(13) Although not described in the embodiment as a configuration, the display device 110 may further include an audio output unit (speaker) and, when sales promotion information is displayed, output a sound as illustrated in FIG. 1 and the like to attract the customer's attention.

In addition, a sound signal indicating the content of sales promotion information may be output as well as displaying the sales promotion information.

(14) Although it is assumed in the embodiment that when a product is returned, the product is returned to an original display shelf (need not be exactly the same position insofar as the product is returned to its display shelf), the product need not necessarily be returned to the original display shelf.

The customer might return a product to a different shelf. In order to handle such a situation, the display device 110 may obtain weight information from weight sensors 120 for nearby products and determine whether the weight obtained from a weight sensor 120 other than the weight sensor 120 corresponding thereto has increased by a value corresponding to the product corresponding thereto. If the weight transmitted from this weight sensor 120 has increased by a value corresponding to the product corresponding to the display device 110 in question, the display device 110 may display the second sales promotion information.

Alternatively, whether the product has been returned to another display shelf may be determined through an image analysis.

(15) In the embodiment, a method for identifying sales promotion information according to a target (refer to the targets 602 illustrated in FIG. 6) whose image has been captured by the camera 130 has been disclosed. The sales promotion information to be displayed may vary in accordance with a condition under which sales promotion information is used, instead of the target 602 or in addition to the target 602.

For example, the information providing system may store different pieces of sales promotion information in accordance with hours, namely, for example, morning and afternoon, as the condition and identify the sales promotion information to be displayed in accordance with a time at which the product has been picked up or returned.

(16) A control program including program codes for causing the server 100, processors of the display devices 110 and the like, and various circuits connected to the processors to execute the operations (refer to FIGS. 7 and 9) relating to the communication for obtaining sales promotion information, the process for displaying the sales promotion information (refer to FIG. 8), and the like may be recorded on a recording medium or distributed through various communication paths. The recording medium may be an IC card, a hard disk, an optical disk, a flexible disk, a read-only memory (ROM), or the like. The distributed control program is used after stored in a memory or the like that can be read by a processor. By executing the control program, the processor realizes various functions described in the embodiment.

(17) The function units of the server 100 and the display device 110 described in the embodiment may be realized as circuits that execute the functions thereof, or may be realized by executing the program using one or a plurality of processors. In addition, a storage battery pack in the embodiment may be configured as a package of ICs, large-scale integration (LSI) integrated circuits, or another type of integrated circuits, instead. The package is incorporated into various devices and used. As a result, various devices can realize the functions described in the embodiment.

The function blocks are realized as LSI, which is typically an integrated circuit. The function blocks may each be realized as a chip, or some or all of the function block may be realized as a chip. Although the term "LSI" has been used here, other terms including "IC", "system LSI", "super LSI", and "ultra LSI" may be used depending on the number of components per chip. In addition, the method for realizing the function blocks as an integrated circuit is not limited to LSI. The function blocks may be realized using dedicated circuits or general-purpose processors. After an LSI integrated circuit is fabricated, a field-programmable gate array (FPGA) capable of performing programming or a reconfigurable processor capable of reconfiguring connections and settings of circuit cells inside the LSI integrated circuit may be used.

(18) The embodiment and the above-described modifications may be combined with one another.

Complements

Aspects of, and effects produced by, a method for providing information in the present disclosure will be described.

(a) A method for providing information according to an aspect of the present disclosure is a method for providing information used by an information providing system that provides sales promotion information. The method includes a first determination step of determining whether a product has been picked up from a display shelf, a first displaying step of displaying, if it has been determined in the first determination step that the product has been picked up from the display shelf, first sales promotion information on a display device, a second determination step of determining whether the product picked up in the first determination step has been returned to the display shelf or whether a certain period of time has elapsed since the product was picked up and whether a motion detector is detecting a person, and a second display step of displaying, if it has been determined in the second determination step that the picked-up item has been returned or that the certain period of time has elapsed since the product was picked up and the motion detector is detecting a person, second sales promotion information, which is different from the first sales promotion information, on the display device.

According to the aspect, different pieces of sales promotion information can be provided when a customer has picked up a product, when the customer is holding the product, and when the customer has decided not to buy the product and returned the product to the display shelf. Therefore, the customer's desire to buy the product can be further stimulated. By providing different pieces of sales promotion information, the product can be promoted to customers in at least two different ways, thereby stimulating the desire of many customers who have various preferences.

In addition, in a series of actions in which the customer picks up a product and holds the product or in a series of actions in which the customer picks up a product and returns the product, at least two types of sales promotion information are provided. Therefore, the customer obtains the at least two types of sales promotion information without performing a corresponding operation and without performing other particular operations. As a result, the customer is not required to perform troublesome operations in order to obtain the at least two types of sales promotion information.

In addition, by displaying sales promotion information when the customer is close to the product, namely when the customer has picked up a product or when the customer has returned the product, the sales promotion information can be seen by the customer more certainly.

(b) In the method according to (a), for example, the information providing system may include a sales promotion information database storing a plurality of pieces of sales promotion information. The method may further include an obtaining step of obtaining, using the display device, the first sales promotion information and the second sales promotion information from the sales promotion information database.

As a result, the display device can obtain and display sales promotion information even if the display device has not stored the sales promotion information. In addition, the display device can obtain new sales promotion information in accordance with a change in the corresponding product.

(c) In the method according to (a), for example, the first sales promotion information and the second sales promotion information may be different types of sales promotion information.

As a result, the first sales promotion information and the second sales promotion information to be displayed need not be the same sales promotion information such as sales promotion information indicating a discount. By displaying the first sales promotion information and the second sales promotion information as different types of sales promotion information, the virtues of the product can be promoted in many ways, thereby stimulating the customer's desire to buy the product. Here, the term "different types" refers to different concepts of sales promotion information such as a combination of the sales promotion information described in the first examples and the sales promotion information described in the fourth examples.

(d) In the method according to (a), for example, the first sales promotion information and the second sales promotion information may be sales promotion information regarding different products. In the first display step, the first sales promotion information regarding the picked-up item may be displayed, and in the second display step, the second sales promotion information regarding a product different from the picked-up item may be displayed.

As a result, when the customer has picked up a product, sales promotion information regarding the product is displayed to stimulate the customer's desire to buy the product. When the customer has returned the product, it is possible to stimulate the customer's desire to buy another product.

(e) In the method according to (a), for example, the first sales promotion information and the second sales promotion information may be sales promotion information regarding different products. In the first display step, the first sales promotion information regarding a product different from the picked-up item may be displayed, and in the second display step, the second sales promotion information regarding the picked-up item may be displayed.

As a result, when the customer has picked up a product, sales promotion information regarding a product different from the picked-up item is displayed to stimulate the customer's desire to buy the product different from the picked-up item. When the customer has returned the product, sales promotion information regarding the product is displayed to stimulate the customer's desire to buy the product, which has just been returned.

(f) In the method according to (a), for example, the information providing system may include a customer information database storing customer information regarding customers and a detector that detects a person approaching the display shelf for the product. The method may further include an identification step of identifying, if the detector has detected a person approaching the product, the person, a determination step of determining whether the person identified in the identification step is registered in the customer information database, and an identification step of identifying, if it has been determined in the determination step that the person identified in the identification step is registered in the customer information database, first sales promotion information and second sales promotion information according to the person. In the first display step, the first sales promotion information identified in the identification step may be displayed. In the second display step, the second sales promotion information identified in the identification step may be displayed.

As a result, the display device can display sales promotion information according to the customer. Therefore, the display device can display sales promotion information that can attract the customer's attention more effectively, thereby effectively stimulating the customer's desire to buy the product.

(g) In the method according to (a), for example, the information providing system may include a detector (second motion detector) that detects a person approaching the display shelf for the product. The method may further include a third display step of displaying, if the detector has detected a person approaching the display shelf for the product, third sales promotion information regarding the product on the display device.

As a result, the display device also displays sales promotion information while the customer is approaching the product, thereby increasing the number of opportunities to display sales promotion information and stimulating the customer's desire to buy the product.

(h) The method according to (a) may further include, for example, a measurement step of measuring time taken until the product is returned to the display shelf after the product is picked up from the display shelf. The second sales promotion information may include at least two types of sales promotion information. In the second display step, if the time measured in the measurement step is within a certain period of time, second sales promotion information of a first type may be displayed, and if the time measured in the measurement step exceeds the certain period of time, second sales promotion information of a second type may be displayed.

As a result, sales promotion information according to time for which the customer has considered whether to buy a product can be displayed, thereby effectively stimulating the customer's desire to buy the product in accordance with the psychology of the customer at that particular moment.

(i) The method according to (a) may further include, for example, a measurement step of beginning to measure time when the product has been picked up from the display shelf and a third display step of displaying, if a certain period of time has elapsed without the product being returned to the display shelf since the product was picked up from the display shelf, third sales promotion information, which is different from the first sales promotion information and the second sales promotion information.

As a result, if the certain period of time has elapsed while the customer is considering whether to buy the product, new sales promotion information is displayed, thereby further stimulating the customer's desire to buy the product.

(j) The method according to (i) may further include, for example, a person detection step of sequentially detecting whether any person is present around the display shelf for the product. In the third display step, only if it has been determined in the person detection step that any person is present around the display shelf, the third sales promotion information may be displayed.

As a result, if the customer has picked a product and walked away after putting the product in a shopping basket, it is possible to prevent the third sales promotion information from being displayed in vain.

(k) The method according to (a) may further include, for example, an output step of outputting, using the display device, the number of times of display of the first sales promotion information and the second sales promotion information at certain time intervals.

As a result, for example, the operator of the information providing system can recognize the popularity of the product or the like in accordance with the number of times of display of the first sales promotion information and the second sales promotion information, thereby making it possible to reflect the popularity in future sales promotion information.

(l) Another aspect of the present disclosure is an information providing system that provides sales promotion information. The information providing system includes a sales promotion database storing a plurality of pieces of sales promotion information, at least one display device that is provided close to a display shelf for a product and that displays sales promotion information, a detector that detects that the product has been picked up from the display shelf and that the product has been returned, and a display control unit that, if the detector has detected that the product has been picked up from the display shelf, causes the display device to display first sales promotion information and that, if the detector has detected that the picked-up item has been returned to the display shelf, causes the display device to display second sales promotion information, which is different from the first sales promotion information.

According to the other aspect, sales promotion information can be provided when the customer has picked up a product and when the customer has decided not to buy the product and returned the product to the display shelf, thereby further stimulating the customer's desire to buy the product.

In addition, by displaying sales promotion information when the customer is close to the product, namely when the customer has picked up a product or when the customer has returned the product, the sales promotion information can be seen by the customer more certainly.

(m) In the information providing system according to (l), for example, the detector may include a weight sensor. The detector may detect that, if a weight detected by the weight sensor has decreased by a value corresponding to the product on the display shelf, the product has been picked up and that, if the weight detected by the weight sensor has increased by the value corresponding to the product on the display shelf, the product has been returned.

As a result, by detecting, using the weight sensor, whether the weight has decreased or increased, the information providing system can detect that the customer has picked up the product or that the customer has returned the product.

(n) In the information providing system according to (l), for example, the detector may include a camera for capturing an image of the display shelf for the product. The detector may detect that the product has been picked up or returned by detecting a change in images sequentially captured by the camera.

As a result, the information providing system can detect that the customer has picked up the product or that the customer has returned the product through an image analysis using the camera.

The information providing system in the present disclosure can be used, for example, in a convenience store or a department store that deals with various products, in order to stimulate customers' desire to buy products.

What is claimed is:

1. A method for providing sales information using an information providing system, the information providing system including a database, a display, a detector, a first motion detector, and a server connected to the database, the display, the detector, and the first motion detector for exchanging information there between and controlling the operation of the information providing system, the method comprising:
   detecting, using the detector, a change in weight on a display shelf based on the movement of a commercial item with respect to the display shelf;
   detecting, using the first motion detector, the movement of a person proximate to the display shelf;
   receiving, using the server, information from the detector regarding the change in weight and receiving information from the first motion detector regarding the movement of the person;
   obtaining, using the server, sales promotion information stored in the database and controlling the display of the sales promotion information based on the information received from the detector and the first motion detector;
   displaying, using the display, first sales promotion information obtained from the database when the detector has detected that the commercial item has been picked up from a display shelf based on the change in weight on the display shelf;

displaying, using the display, second sales promotion information obtained from the database, which is different from the first sales promotion information, when the detector has detected that the picked-up item has been returned to the display shelf based on the change in weight on the display shelf or when the first motion detector is detecting that a person is present around the display shelf; and measuring time taken until the commercial item is returned to the display shelf after the commercial item is picked up from the display shelf, wherein the second sales promotion information includes at least two types of sales promotion information, when the measured time is within a certain period of time, second sales promotion information of a first type is displayed on the display, and when the measured time exceeds the certain period of time, second sales promotion information of a second type is displayed on the display.

2. The method according to claim 1,
wherein the first sales promotion information and the second sales promotion information are different types of sales promotion information.

3. The method according to claim 2,
wherein the second sales promotion information is information associated with the first sales promotion information.

4. The method according to claim 1,
wherein the first sales promotion information and the second sales promotion information are sales promotion information regarding different commercial items,
wherein, when the detector has detected that the commercial item has been picked up from the display shelf, the first sales promotion information regarding the picked-up item is displayed on the display, and
wherein, when the detector has detected that the picked-up item has been returned to the display shelf or if the first motion detector is detecting that a person is present around the display shelf, the second sales promotion information regarding a commercial item different from the picked-up item is displayed on the display.

5. The method according to claim 1,
wherein the first sales promotion information and the second sales promotion information are sales promotion information regarding different commercial items,
wherein, when the detector has detected that the commercial item has been picked up from the display shelf, the first sales promotion information regarding a commercial item different from the picked-up item is displayed on the display, and
wherein, when the detector has detected that the picked-up item has been returned to the display shelf or if the first motion detector is detecting that any person is present around the display shelf, the second sales promotion information regarding the picked-up item is displayed on the display.

6. The method according to claim 1,
wherein the system includes a customer information database storing customer information regarding customers,
the method further comprising:
identifying, when a camera connected to the system has detected a person approaching the commercial item, the person;

determining whether the customer information regarding the identified person is registered in the customer information database; and identifying, when it has been determined that the customer information regarding the identified person is registered in the customer information database, first sales promotion information and second sales promotion information according to the person, wherein, when the detector has detected that the commercial item has been picked up from the display shelf, the identified first sales promotion information is displayed on the display, and wherein, when the detector has detected that the picked-up item has been returned to the display shelf or if the first motion detector is detecting that the identified person is present around the display shelf, the identified second sales promotion information is displayed on the display.

7. The method according to claim 1,
wherein the system further includes a second motion detector, and
wherein, when it has been detected as a result of an input from the second motion detector that a person is approaching the display shelf for the commercial item, third sales promotion information regarding the commercial item is displayed on the display.

8. The method according to claim 1, further comprising:
measuring a time when the commercial item has been picked up from the display shelf,
wherein, when a certain period of time has elapsed without the picked-up item being returned to the display shelf since the commercial item was picked up, the second sales promotion information is displayed on the display, and when the picked-up item has been returned to the display shelf, third sales promotion information, which is different from the first sales promotion information and the second sales promotion information, is displayed on the display.

9. The method according to claim 1,
wherein the display displays number information indicating the number of times at which the first sales promotion information and the second sales promotion information are displayed on the display at certain time intervals.

10. The method according to claim 1,
wherein the first sales promotion information and the second sales promotion information are expressions of a mascot,
when the detector has detected that the commercial item has been picked up from the display shelf, the first sales promotion showing an expression of the mascot as being happy is displayed on the display, and
when the detector has detected that the commercial item picked up from the display shelf has been returned to the display shelf, the second sales promotion showing an expression of the mascot as being sad is displayed on the display.

11. An information providing system for providing sales promotion information comprising:
a database configured to store sales promotion information;
a display configured to display the sales promotion information;
a detector configured to detect a change in weight on a display shelf based on movement of a commercial item with respect to the display shelf;

a first motion detector configured to detect motion of a person; and a server configured to be connected to the database, the display, the detector and the first motion detector for exchanging information there between, the server including a hardware processor and a program and the hardware processor executing the program to control operations of the information providing system, wherein when the detector detects a change in weight because the commercial item has been picked up from the display shelf based on the change in weight on the display shelf, the controller controls the display to display first sales promotion information obtained from the database, and when the detector detects that the commercial item has been returned to the display shelf based on the change in weight on the display shelf or when the first detector detects motion of a person proximate to the display shelf, the controller controls the display to display second sales promotion information obtained from the database, which is different from the first sales promotion information, and wherein the controller measures the time taken until the commercial item is returned to the display shelf after the commercial item is picked up from the display shelf, the second sales promotion information includes at least two types of sales promotion information, when the measured time is within a certain period of time, second sales promotion information of a first type is displayed on the display, and when the measured time exceeds the certain period of time, second sales promotion information of a second type is displayed on the display.

12. The information providing system according to claim 11, wherein the detector includes a weight sensor, and when a weight detected by the weight sensor has decreased by a value corresponding to the commercial item on the display shelf, the detector detects that the commercial item on the display shelf is picked up, and when the weight detected by the weight sensor has increased by the value corresponding to the commercial item on the display shelf, the detector detects that the commercial item is returned.

13. The information providing system according to claim 11, wherein the detector includes a camera for capturing an image of the display shelf on which the commercial item is arranged, and wherein the detector detects that the commercial item has been picked up or returned by detecting a change in images captured by the camera.

\* \* \* \* \*